United States Patent
Kim et al.

(10) Patent No.: US 8,052,208 B2
(45) Date of Patent: Nov. 8, 2011

(54) APPARATUS FOR LOCKING TABLE OF SEAT BACK

(75) Inventors: Sang Ho Kim, Incheon (KR); Hyun Ko, Hwaseong-si (KR); Chae Hoon Ma, Hwaseong-si (KR); Sung Ah Kim, Incheon (KR); Seung Hyock Tak, Suwon-si (KR); Jong Kweon Pyun, Suwon-si (KR); Jin Ho Seo, Yongin-si (KR)

(73) Assignees: Hyundai Motor Company, Seoul (KR); Dymos Inc., Seosan-Si (KR)

( * ) Notice: Subject to any disclaimer, the term of this patent is extended or adjusted under 35 U.S.C. 154(b) by 276 days.

(21) Appl. No.: 12/578,100

(22) Filed: Oct. 13, 2009

(65) Prior Publication Data
US 2010/0133857 A1     Jun. 3, 2010

(30) Foreign Application Priority Data
Nov. 28, 2008   (KR) .................. 10-2008-0119496

(51) Int. Cl.
*A47B 83/02*     (2006.01)
(52) U.S. Cl. .................. 297/146; 297/163; 297/188.05; 248/292.12
(58) Field of Classification Search .................. 297/146, 297/163, 169, 173, 188.05, 356; 108/2, 6; 248/242, 291.1, 292.12
See application file for complete search history.

(56) References Cited

U.S. PATENT DOCUMENTS

| | | | | |
|---|---|---|---|---|
| 2,619,395 A * | 11/1952 | Kent | .................. | 297/188.07 |
| 4,519,648 A * | 5/1985 | Jovanovic | .................. | 248/292.12 |
| 4,621,864 A * | 11/1986 | Hill | .................. | 297/115 |
| 4,792,183 A * | 12/1988 | Townsend, III | .................. | 297/163 |
| 5,397,168 A * | 3/1995 | Hand | .................. | 297/356 |
| 5,597,209 A * | 1/1997 | Bart et al. | .................. | 297/411.38 |
| 5,931,527 A * | 8/1999 | D'Onofrio et al. | .................. | 297/146 |
| 6,467,847 B2 * | 10/2002 | Bidare | .................. | 297/411.32 |
| 7,284,799 B2 * | 10/2007 | Chung | .................. | 297/411.38 |
| 2006/0214479 A1 * | 9/2006 | Dwire et al. | .................. | 297/163 |

* cited by examiner

*Primary Examiner* — Peter R. Brown
(74) *Attorney, Agent, or Firm* — Morgan, Lewis & Bockius LLP

(57) ABSTRACT

An apparatus for locking a table of a seat back to selectively secure the table in multiple stages, may include a base, a shaft coupled to the base and the table, an actuating arm fastened to the shaft and rotatable with the shaft, the actuating arm having actuating gear teeth, a locking arm rotatably provided on the base, wherein the locking arm includes locking gear teeth and the locking gear teeth is selectively engaged with the actuating gear teeth by the actuating arm such that when the actuating arm is rotated in a forward direction, the actuating gear teeth is engaged with the locking gear teeth or pass over the locking gear teeth according to rotational degree of the actuating arm, and a locking arm holding unit co-axially coupled with the actuating arm to the base and selectively activated by the actuating arm.

10 Claims, 9 Drawing Sheets

APPARATUS FOR LOCKING TABLE OF SEAT BACK

CROSS-REFERENCE TO RELATED APPLICATION

The present application claims priority to Korean Patent Application Number 10-2008-0119496 filed Nov. 28, 2008, the entire contents of which application is incorporated herein for all purpose by this reference.

BACKGROUND OF THE INVENTION

1. Field of the Invention

The present invention relates to an apparatus for locking a table of a seat back such that the table can be maintained in a state of having been extracted from or refracted into the seat back, and an angle of the table with respect to the seat back in the extracted state is adjustable.

2. Description of Related Art

Recently, according to an increase in the needs of consumers with respect to installation of various systems for convenience in vehicles, various kinds of apparatuses for convenience are installed in rear seats of the vehicles.

A table of a seat back is a representative example of the convenience apparatuses which are installed in the rear seats of the vehicles. A table may be provided on a seat back to allow a passenger to place food, books or the like on the table. The table of the seat back is preferably constructed such that when the use of the table is required, the table can be extracted from the seat back, and when it is not required, the table can be folded onto the seat back.

FIG. 1 is a view showing a table of a seat back, according to a conventional art. As shown in the drawing, a table T for a passenger, who sits on a rear seat, is provided on a rear surface of a seat back S of a front seat. For installation of the table T on the seat back S, a table locking apparatus is provided between the table T and the seat back S. In this art, as the table locking apparatus, a gas spring (not shown) is provided between the table T and the seat back S to unfold the table T from the seat back S and maintain the unfolded state of the table T.

However, in the conventional art, because of the volume of the gas spring, the table T is installed on the seat back S in a shape in which it protrudes from the seat back S. Therefore, the external appearance of the seat back S is deteriorated, and there is a possibility of interference between the table T and the knees of the passenger.

Furthermore, the installation of the gas spring increases the cost of manufacturing the seat back S having the table T.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for locking a table of a seat back which can adjust an angle, at which the table is unfolded from the seat back, using a relatively simple structure, and which minimizes a space for installation of the table in the seat back, thus preventing the table from interfering with knees of a passenger.

In an aspect of the present invention, the apparatus for locking a table of a seat back, the apparatus being provided between the table and the seat back to selectively secure the table with respect to the seat back in multiple stages, may include a base fastened to the seat back, a shaft pivotally coupled to the base and fastened on an end portion of the table, the shaft being rotatable along with the table on the base, an actuating arm fastened to the shaft and rotatable along with the shaft, the actuating arm having actuating gear teeth formed in an end portion thereof, a locking arm rotatably provided on the base at a position spaced apart from the shaft by a predetermined distance, wherein the locking arm includes locking gear teeth formed in an end portion thereof and elastically biased toward the shaft and the locking gear teeth is configured to be selectively engaged with the actuating gear teeth by a rotation of the actuating arm such that when the actuating arm is rotated in a forward direction, the actuating gear teeth is engaged with the locking gear teeth or pass over the locking gear teeth according to rotational degree of the actuating arm, and a locking arm holding unit co-axially coupled with the actuating arm to the base and selectively activated by the actuating arm, wherein, while the actuating gear teeth completely pass over the locking gear teeth, the actuating arm activates the locking arm holding unit to release the locking arm from a first position of the locking arm holding unit to be locked to a second position thereof so that the locking gear teeth does not interfere with the actuating gear teeth while the actuating arm is rotated in a reverse direction, and wherein the locking arm holding unit releases the locking arm to return to the first position of the locking arm holding unit so that the locking gear teeth is positioned to a trajectory locus of the locking gear teeth when the actuating arm rotates the locking arm holding unit in the reverse direction.

The apparatus may further include a guide pin provided on the actuating arm and configured to be selectively coupled to the locking arm holding unit according to a rotational direction of the actuating arm, wherein a guide slot is formed in the locking arm holding unit to receive the guide pin of the actuating arm therein, the guide slot extending a predetermined length along a trajectory locus of the guide pin, so that when the guide pin pushes a first end of the guide slot, the locking arm holding unit is rotated in the forward direction, when the guide pin pushes a second end of the guide slot, the locking arm holding unit is rotated in the reverse direction, and while the guide pin moves between the first and second ends of the guide slot, the locking arm holding unit is secured stationary.

The apparatus may further include a stop protrusion provided on the locking arm holding unit, a hook pivotally mounted to the base, and a stopper fastened to the hook to rotate along with the hook, wherein the hook or the stopper is elastically supported to bias the hook toward the locking arm holding unit to selectively couple the hook to the stopper protrusion of the locking arm holding unit, and wherein the hook is configured to lock the stop protrusion to the base to prevent the locking arm holding unit from rotating in the reverse direction while the locking arm is locked to the locking arm holding unit in the second position thereof; but when the actuating arm is rotated in the reverse direction to the predetermined distance, the stopper is pushed by the guide pin of the actuating arm to release the hook from the stop protrusion to enable the locking arm holding unit to rotate in the reverse direction by the actuating arm, wherein the stopper is disposed in front of the second end of the guide slot in the reverse direction of the locking arm holding unit such that the hook is released from the stopper protrusion before the second end of the guide slot is activated by the actuating arm when the locking arm holding unit rotates in the reverse direction.

A locking pin may be provided on the locking arm, and a locking depression is formed at the second position of the locking arm holding unit, so that while the locking arm holding unit is rotated in the forward direction, the locking pin is locked to the locking depression by the locking arm holding unit while the actuating gear teeth pass over the locking gear teeth, wherein an insert depression extending from one end of the insert depression is formed at the first position of the locking arm holding unit so that the locking pin of the locking arm is inserted into the insert depression when the guide pin rotating in the reverse direction activates the second end of the guide slot of the locking arm holding unit, and wherein a rotational radius between the rotation axis of the locking arm holding unit and the insert depression is shorter than a rotational radius between the rotation axis of the locking arm holding unit and the locking depression.

In another aspect of the present invention, the apparatus may further include a stop protrusion provided on the locking arm holding unit, wherein a subsidiary locking unit is pivotally coupled to the base at a predetermined position thereof and while the locking arm is locked to the second position of the locking arm holding unit, the subsidiary locking unit locks the stop protrusion to the base to prevent the locking arm holding unit from rotating in the reverse direction, wherein the subsidiary locking unit includes, a hook pivotally mounted to the base, and a stopper fastened to the hook to rotate along with the hook, wherein the hook or the stopper is elastically supported to bias the hook toward the locking arm holding unit to selectively couple the hook to the stopper protrusion of the locking arm holding unit, and wherein the hook is configured to lock the stop protrusion to the base to prevent the locking arm holding unit from rotating in the reverse direction while the locking arm is locked to the locking arm holding unit in the second position thereof, but when the actuating arm is rotated in the reverse direction to the predetermined distance, the stopper is pushed by the guide pin of the actuating arm to release the hook from the stop protrusion to enable the locking arm holding unit to rotate in the reverse direction by the actuating arm.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
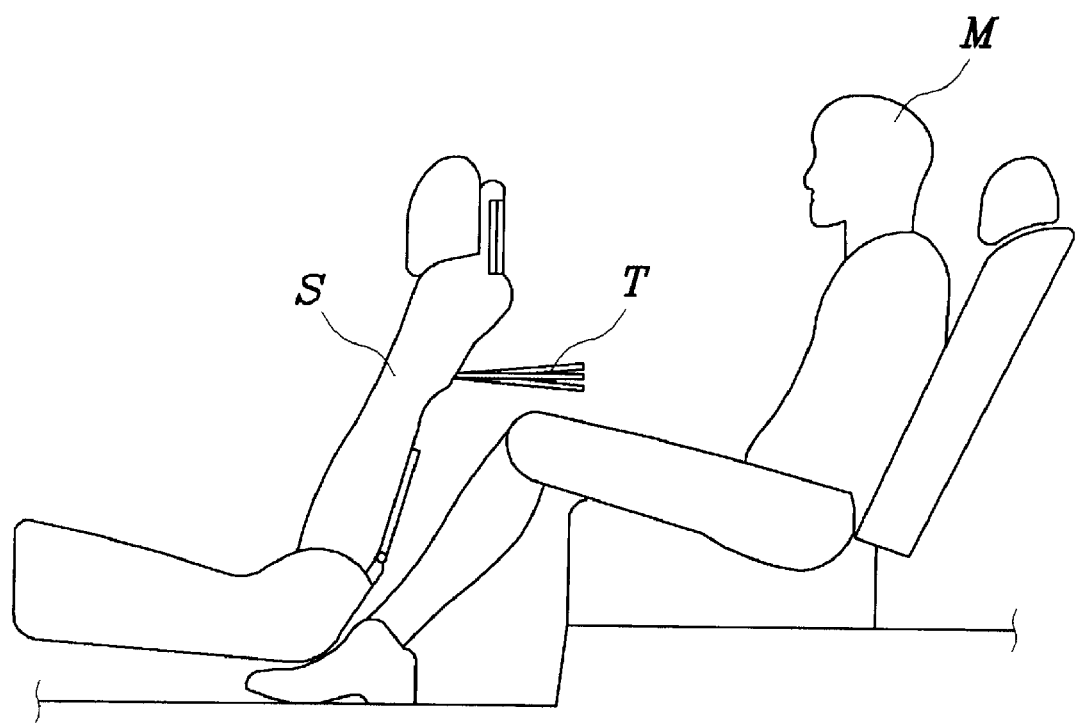
FIG. 1 is a view showing a conventional table of a seat back.
Figure 2:
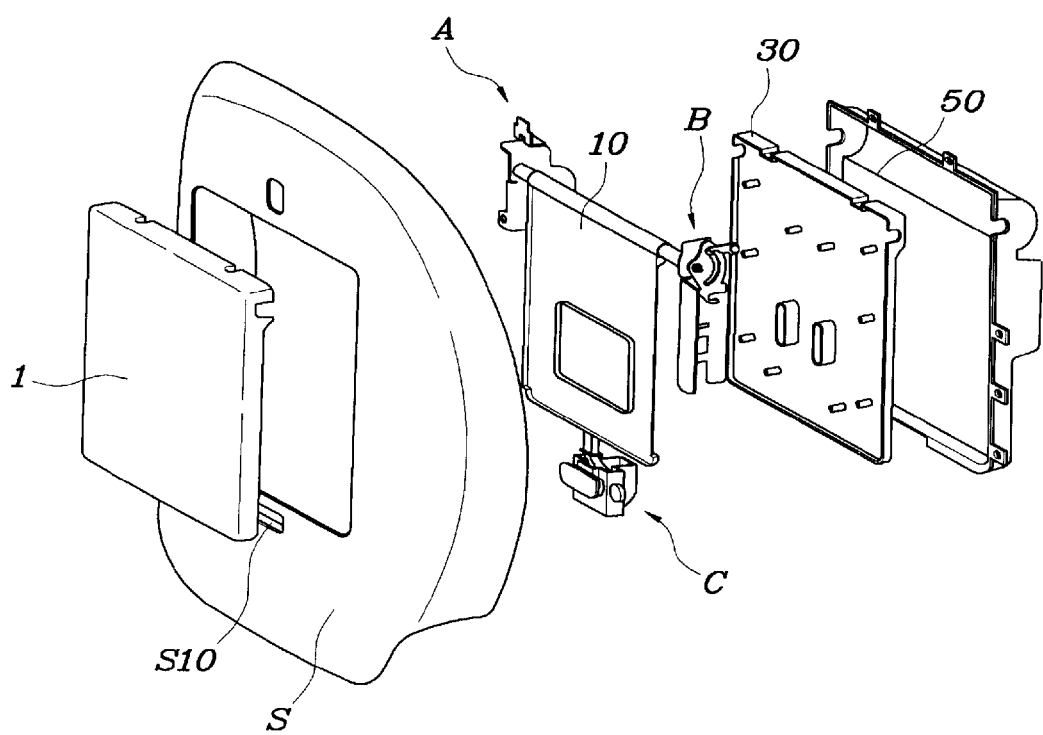
FIG. 2 is an exploded perspective view of an exemplary seat back having an apparatus for locking a table of the seat back, according to the present invention.

FIG. 2 is an exploded perspective view of an apparatus for locking a table of a seat back S, according to various embodiments of the present invention. The seat back table is installed on the seat back S and includes a front cover 1, a table frame 10, the table locking apparatus (B), a table support plate 30 and a rear cover 50. The table frame 10 is fastened to a shaft 100 and rotated along with the shaft 100. The shaft 100 is coupled to the locking apparatus B such that an angle at which the shaft 100 is rotated is determined in stages. Actuating structures are provided on the respective opposite ends of the shaft 100, that is, on portions designated by the reference characters A and B. The locking apparatus means the portion B. A latch unit C is provided in the lower end of the seat back, so that a latch of the table is inserted into the seat back through a seating hole S10 and is selectively latched to the latch unit C.

Figure 3:
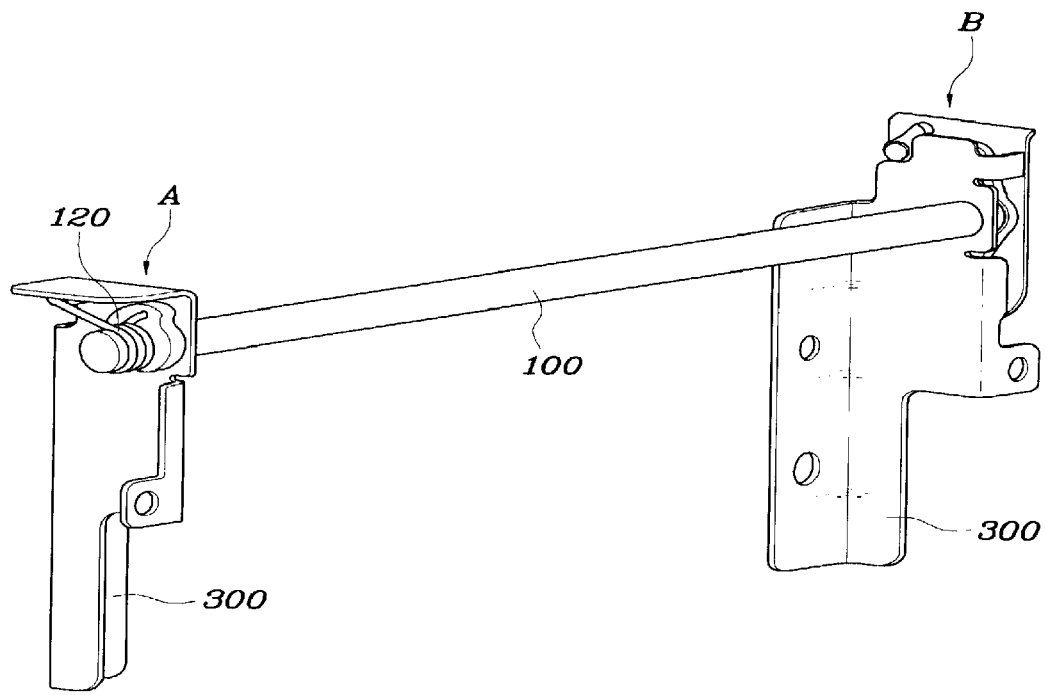
FIG. 3 is a perspective view of the table locking apparatus of FIG. 2.

FIG. 3 is a perspective view of the table locking apparatus of FIG. 2. The table frame 10 which is rotated along with the shaft 100 is fastened to the shaft 100. A spring 120 is provided on a first end (on the portion A) of the shaft 100 to elastically support the table frame 10. The table locking apparatus of the present invention is provided on a second end (on the portion B) of the shaft 100. For the installation of the table locking apparatus, bases 300 are provided on the shaft 100.

Figure 4:
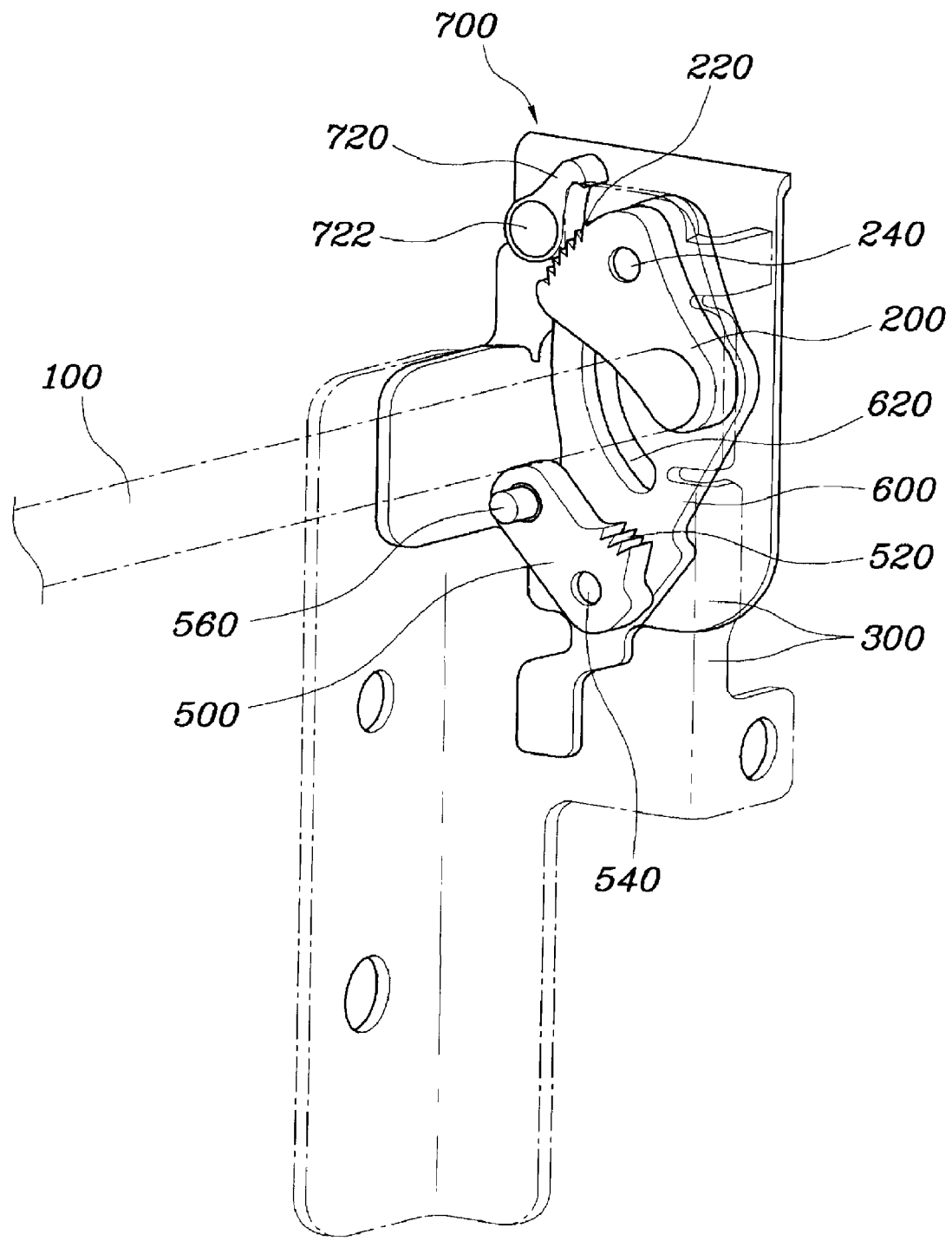
FIG. 4 is a perspective view showing a first side of a portion B of the table locking apparatus of FIG. 3.
Figure 5:
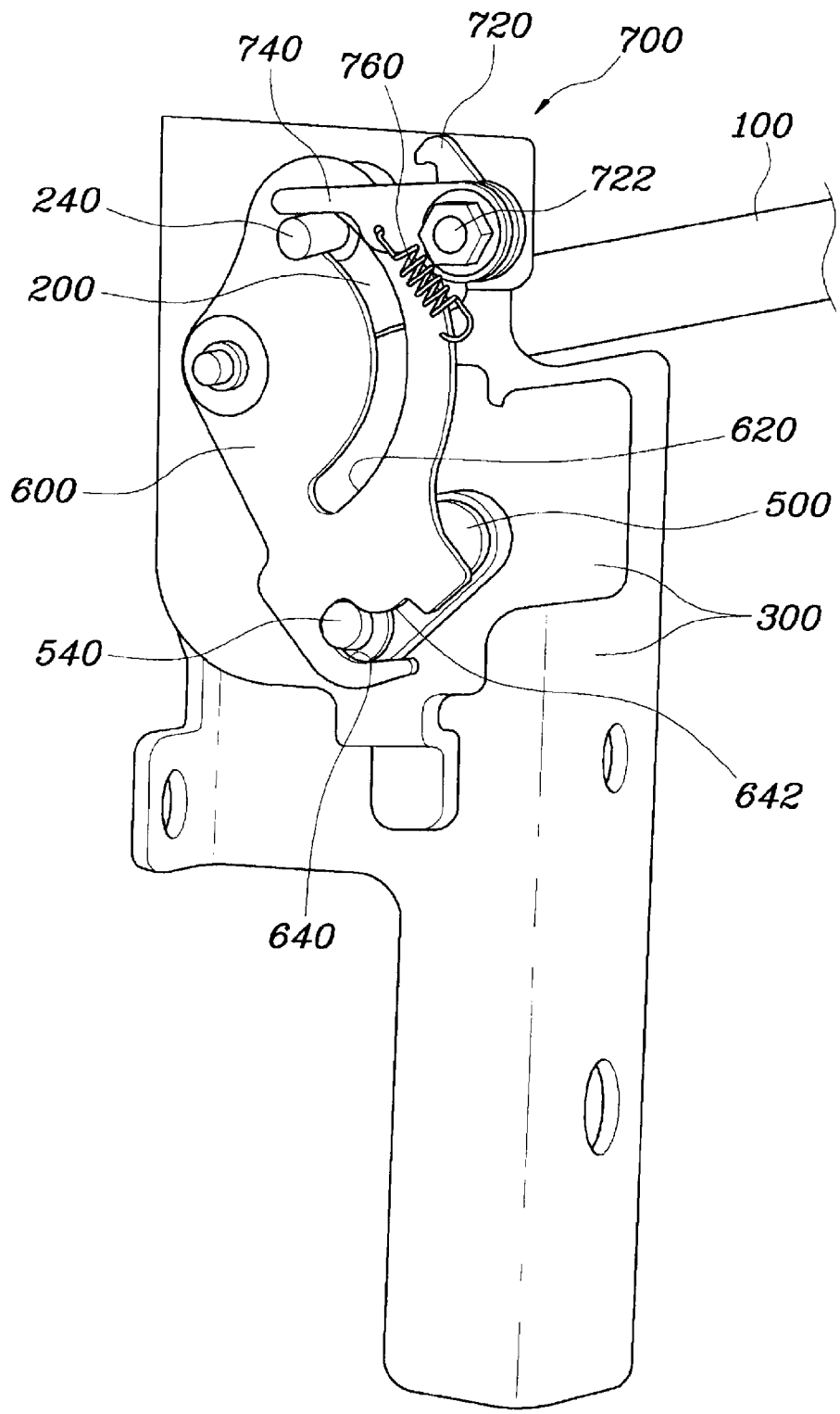
FIG. 5 is a perspective view showing a second side of the portion B of the table locking apparatus of FIG. 3.

FIGS. 4 and 5 are perspective views showing the table locking apparatus according to various embodiments of the present invention. The table locking apparatus is provided between the seat back S and the table T and selectively determines a position at which the table T is in a locked state. In detail, the table locking apparatus includes the shaft 100, which is provided on one end of the table T and rotated along with the table T on the seat back S, and an actuating arm 200, which is fastened to the shaft 100 and rotated along with the shaft 100. Actuating gear teeth 220 are formed in a distal end of the actuating arm 200.

The table locking apparatus further includes the bases 300, which are provided on the shaft 100, and a locking arm 500, which is provided on one base 300 at a position spaced apart from the shaft 100 by a predetermined distance. Locking gear teeth 520 which engage with the actuating gear teeth 220 of the actuating arm 200 are formed in an end of the locking arm 500 which is adjacent to the shaft 100. The locking arm 500 is elastically supported by an elastic member 562 so that when the actuating arm 200 is rotated in a normal direction, the actuating gear teeth 220 pass over the locking gear teeth 520 in stages.

The table locking apparatus further includes a locking arm holding unit 600, which is provided between the actuating arm 200 and the locking arm 500. The locking arm holding unit 600 moves the locking arm 500 backwards and holds it in the backwardly moved state after the actuating gear teeth 220 completely pass over the locking gear teeth 520, thus preventing the actuating gear teeth 220 and the locking gear teeth 520 from interfering with each other when the actuating arm 200 is reversely rotated. Furthermore, the locking arm holding unit 600 releases the backwardly moved and held state of the locking arm 500 when the actuating arm 200 is returned to its original position.

The bases 300 are disposed on opposite sides of the table T and fastened to the seat back S. Each base 30 may be made of several panels, and the shaft 100 may pass through the bases 30. The shaft 100 is fastened to the table T so that when a user rotates the table T, the shaft 100 is rotated along with the table T. The actuating arm 200 is fitted over and fastened to the shaft 100 and is thus rotated along with the shaft 100. Furthermore, the locking arm holding unit 600 is fitted over the shaft 100 so as to be rotatable with respect to the shaft 100.

When the table T is extracted from the seat back and is rotated upwards, the shaft 100 and the actuating arm 200 rotate in normal directions. When the table T is rotated downwards and is retracted into the seat back, the shaft 100 and the actuating arm 200 rotate in reverse directions. Here, the terms 'normal direction' and 'reverse direction' merely mean that the directions are opposite each other, but are not to be construed as limiting the present invention.

Meanwhile, the actuating arm 200 is fitted at a proximal end thereof over the shaft 100 and has the actuating gear teeth 220 in the distal end thereof. It is preferable that the actuating gear teeth 200 be spur gear teeth. Furthermore, a guide pin 240 is provided on the actuating arm 200. A guide slot 620 which guides the guide pin 240 therein and extends a predetermined length along a movement trajectory of the guide pin 240 is formed through the locking arm holding unit 600. The guide pin 240 is moved along the guide slot 620 of the locking arm holding unit 600 when the actuating arm 200 is rotated. Here, the guide pin 240 moves along the guide slot 620, but the locking arm holding unit 600 maintains the stationary state.

The locking arm 500 is provided on the base 300 by a hinge pin 560 below the locking arm holding unit 600. The locking gear teeth 520 corresponding to the actuating gear teeth 220 are formed on a distal end of the locking arm 500. It is also preferable that the locking gear teeth 520 are spur gear teeth. The locking arm 500 having the locking gear teeth 520 is supported by the elastic member 562.

When the table T, the shaft 100 and the actuating arm 200 rotate in normal directions, the actuating gear teeth 220 of the actuating arm 200 come into contact with the locking gear teeth 520 of the locking arm 500. Here, when the actuating gear teeth 220 push the locking gear teeth 520, the locking arm 500 moves while overcoming the elastic force of the elastic member 562, and the actuating gear teeth 220 pass over the locking gear teeth 520 in stages. The number of stages in which the table T is unfolded is determined depending on the number of actuating gear teeth 220 and the number of locking gear teeth 520. The table T can maintain a state of having been unfolded at various angles in stages.

Meanwhile, a locking pin 540 is provided on the locking arm 500. An insert depression 640, into which the locking pin 540 is inserted, is formed in the lower end of the locking arm holding unit 600. A locking depression 642 which extends from the insert depression 640 is formed in the locking arm holding unit 600. While the locking pin 540 is in a state of having been inserted in the insert depression 640 of the locking arm holding unit 600, the locking arm holding unit 600 maintains the stationary state as the locking arm 500 and the actuating arm 200 are engaged each other and the locking arm 500 is supported by the elastic member 562.

After the actuating arm 200 is rotated in the normal direction and the actuating gear teeth 220 completely pass over all the locking gear teeth 520, if the actuating arm 200 is further rotated, the guide pin 240 of the actuating arm 200 pushes a first end 622 of the guide slot 620, and the locking arm holding unit 600 is thus rotated in the normal direction. Then, the locking pin 540 is pushed by the rotation of the locking arm holding unit 600 in the normal direction. Thus, the locking pin 540 is removed from the insert depression 640 and locked to the locking depression 642. When the locking pin 540 enters the locking depression 642, the locking arm 500 overcomes the elastic force of the elastic member 562 and is moved backwards from its original position. When the locking pin 540 is in the state of having been locked to the locking depression 642, the locking arm 500 maintains the state of being moved backwards. Thereby, the locking gear teeth 520 of the actuating gear 220 no longer engage with the actuating gear teeth 220 of the actuating arm 200.

Furthermore, a stop protrusion 660 is provided on an upper end of the locking arm holding unit 600 which is opposite the locking arm 500. A subsidiary locking unit 700 is provided at a predetermined position on the base 300. The subsidiary locking unit 700 hooks the stop protrusion 660 in the state in which the locking arm holding unit 600 rotates in the normal direction and the locking arm 500 is thus moved backwards and locked to the locking arm holding unit 600, thus preventing the locking arm holding unit 600 from being undesirably rotated in the reverse direction. The subsidiary locking unit 700 includes a hook 720, which is mounted to the base 300 by a hinge pin 722 and hooks the stop protrusion 660 to prevent the locking arm holding unit 600 from being rotated in the reverse direction, and a stopper 740, which is rotated along with the hook 720 and is supported by a spring 760. When the actuating arm 200 is rotated in the reverse direction, the stopper 740 is pushed upwards by the guide pin 240 and thus moves the hook 720 backwards to enable the locking arm holding unit 600 to rotate in the reverse direction.

The hook 720 and the stopper 740 are mounted together to the base 300 by the hinge pin 722. The stopper 740 is connected to a spring 760, which biases the stopper 740 downwards. Therefore, when the guide pin 240 of the actuating arm 200 pushes the stopper 740, the stopper 740 and the hook 720 are rotated upwards. When the guide pin 240 is removed from the stopper 740, the stopper 740 and the hook 720 are rotated downwards again.

When the actuating arm 200 rotates in the normal direction and the locking arm holding unit 600 is rotated in the normal direction by the guide pin 240, the stop protrusion 660 of the locking arm holding unit 600 is hooked to the hook 720, thus preventing the locking arm holding unit 600 from rotating in the reverse direction. When the actuating arm 200 rotates in the reverse direction, the guide pin 240 pushes the stopper 740 upwards such that the hook 720 is removed from the stop protrusion 660. When the guide pin 240 pushes a second end 624 of the guide slot 620 of the locking arm holding unit 600, the locking arm holding unit 600 is rotated in the reverse direction, and the locking pin 540 is removed from the locking depression 642 and enters the insert depression 640 again. In addition, the locking arm 500 is returned to its original position.

Figure 6:
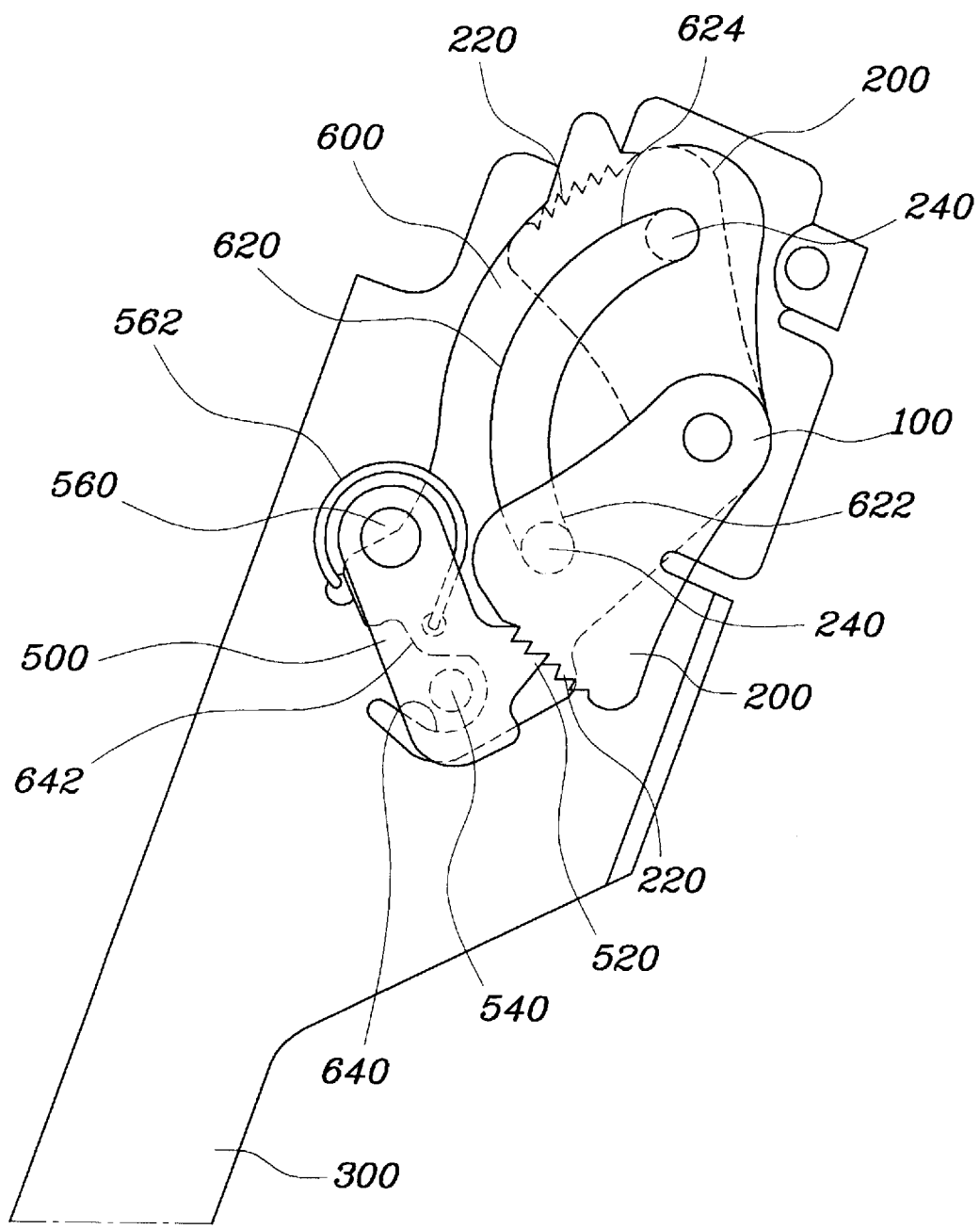
FIGS. 6 and 7 are sectional views illustrating the operation of the table locking apparatus of FIG. 3.
Figure 7:
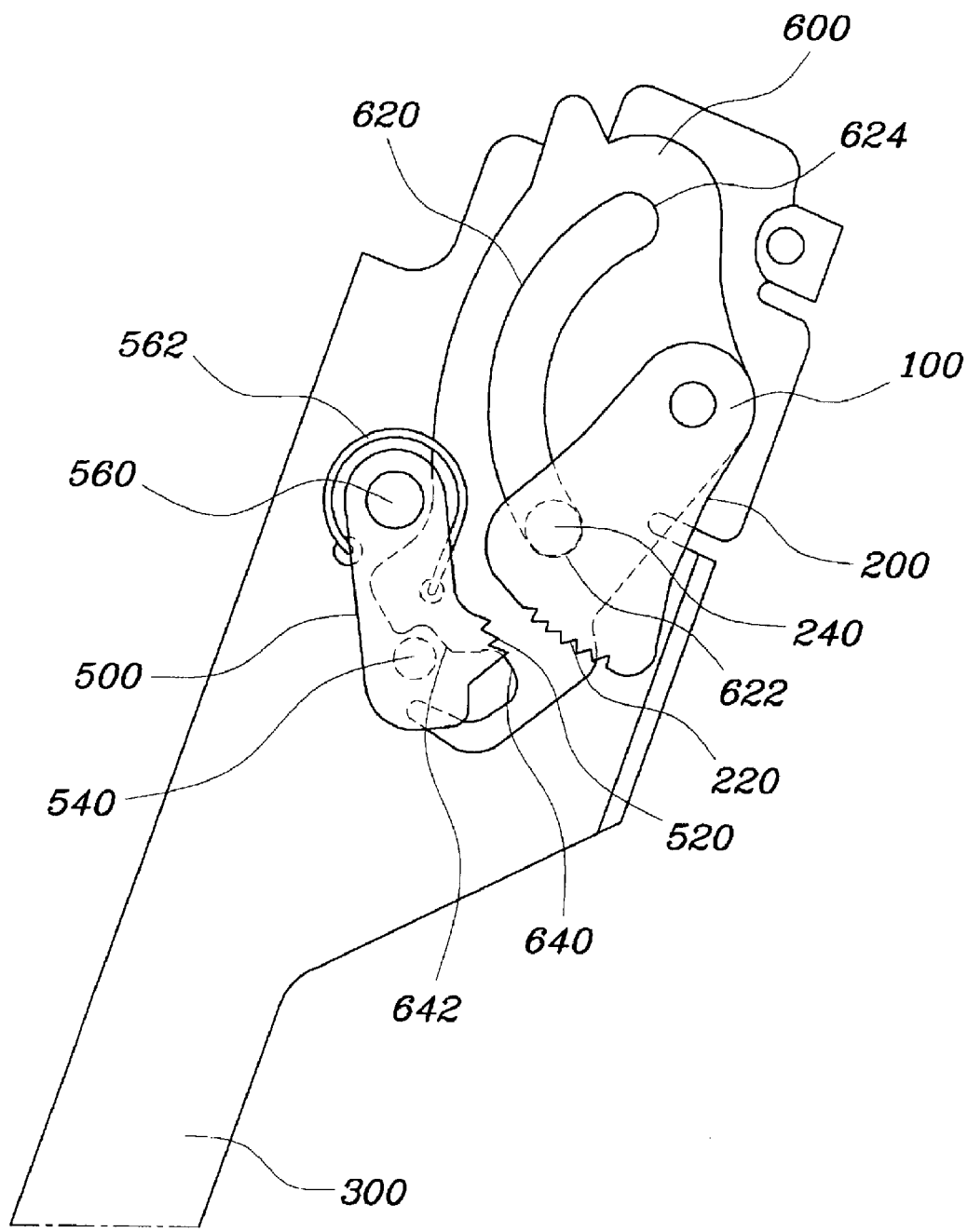

FIGS. 6 and 7 are sectional views illustrating the operation of the table locking apparatus of FIG. 3. In an initial stage, the actuating arm 200 is disposed at the upper end of the locking arm holding unit 600, and the guide pin 240 is disposed on the second end 624 of the guide slot 620. From this state, when the table T is rotated upwards, the actuating arm 200 is rotated along with the shaft 100 in the normal direction. At this time, the position of the table T is adjusted in stages while the actuating gear teeth 220 pass over the locking gear teeth 520.

After the guide pin 240 is brought into contact with the first end 622 of the guide slot 620, when the actuating arm 200 is further rotated, the guide pin 240 rotates the locking arm holding unit 600 in the normal direction. Then, the locking pin 540 of the locking arm 500 is removed from the insert depression 640 and enters the locking depression 642. This means that the locking arm 500 overcomes the elastic force of the elastic member 562 and is locked to the locking arm holding unit 600. Hence, the locking arm 500 is maintained in the state of having been moved backwards and locked to the locking arm holding unit 600.

When the locking arm 500 is in the backwardly moved and locked state, the locking gear teeth 520 is prevented from interfering with the actuating gear teeth 220. Therefore, when the table T is rotated downwards, the table T, the shaft 100 and the actuating arm 200 can be rotated in the reverse directions and returned to their original positions. When the guide pin 240 of the actuating arm 200 pushes the second end 624 of the guide slot 620 by the reverse rotation of the actuating arm 200, the locking arm holding unit 600 is also rotated in the reverse direction. Then, the locking pin 540 of the locking arm 500 is removed from the locking depression 642 and inserted into the insert depression 640 again. Thus, the locking arm 500 is returned to its original position, at which the locking gear teeth 520 of the locking arm 500 can engage with the actuating gear teeth 220 of the actuating arm 200.

As such, in the present invention, when the table T is rotated upwards, that is, in the normal direction, from the state in which it has been retracted in the seat back S, the angle of the table T with respect to the seat back S can be adjusted in stages. When the table T is maximally rotated upwards, the locking arm 500 is moved backwards and locked, so that the table T enters the state in which it can be rotated in the reverse direction and retracted into the seat back S. After the table T is rotated in the reverse direction at a predetermined angle, the locking arm 500 is returned to its original position. As described above, because the table locking apparatus is provided on one end of the shaft 100, to which the table T is fastened, the table T can be flush with the surface of the seat back. Furthermore, the present invention does not require a separate gas spring mechanism, thus reducing the production cost.

Figure 8:
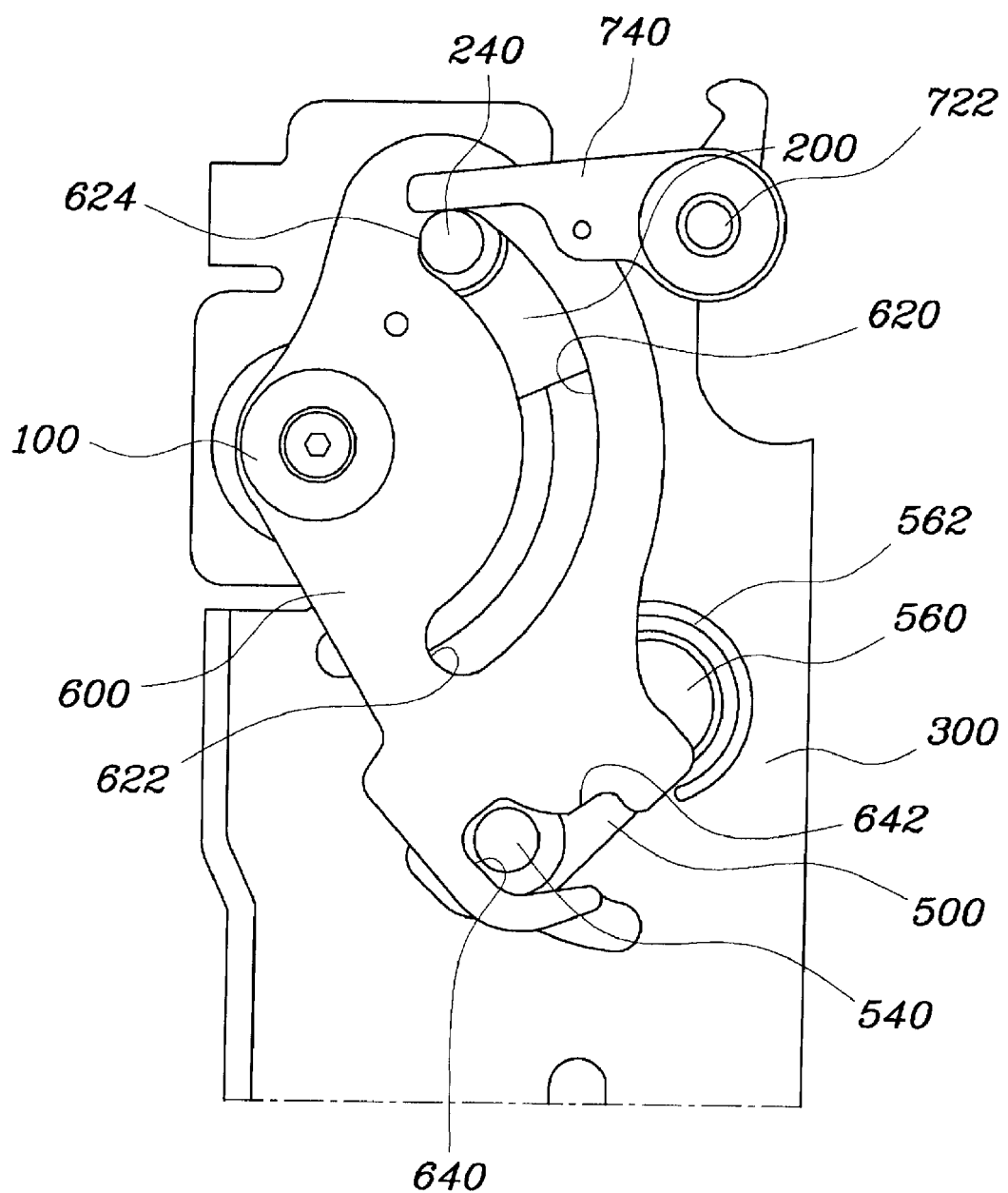
FIGS. 8 and 9 are front views illustrating the operation of the table locking apparatus of FIG. 3.
Figure 9:
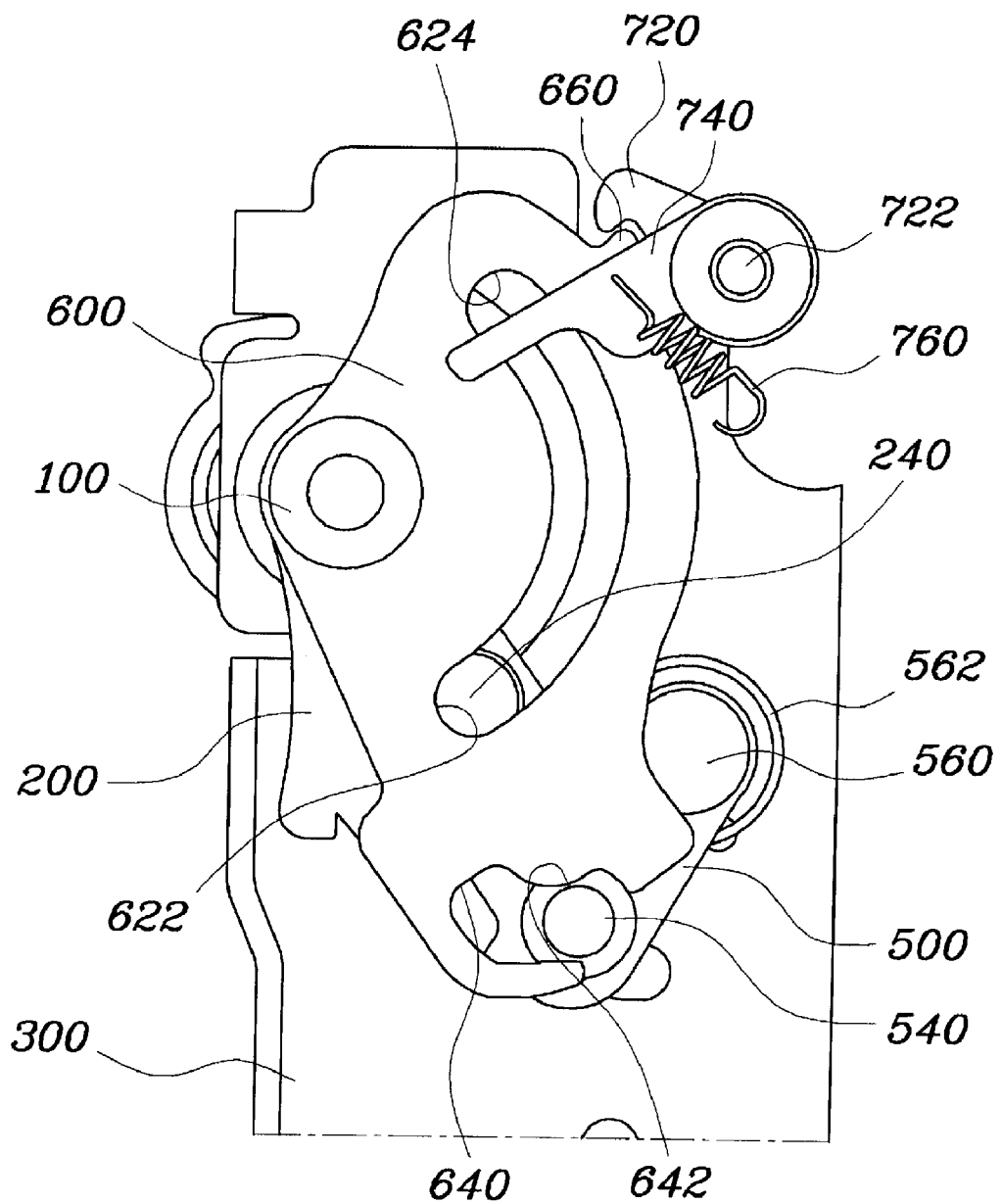

FIGS. 8 and 9 are front views illustrating the operation of the table locking apparatus. When the guide pin 240 is disposed on the second end 624 which is the uppermost end of the guide slot 620, the guide pin 240 pushes the stopper 740 upwards and thus supports it. In this state, when the table T, the shaft 100 and the actuating arm 200 are rotated in the normal directions, the guide pin 240 is moved downwards along the guide slot 620, and the stopper 740 and the hook 720 are returned to their original positions. Thereafter, when the guide pin 240 pushes the first end 622 of the guide slot 620 and the locking arm holding unit 600 is thus rotated in the normal direction, the locking pin 540 is removed from the insert depression 640 and inserted into the locking depression 642 while compressing the elastic member 562. Here, because the elastic member 562 of the locking arm 500 always biases the locking arm 500 to its original position, if the locking pin 540 is not in a state of being completely locked to the locking depression 642, the locking arm 500 is returned to its original position by the elastic force of the elastic member 562. Then, the locking pin 540 strikes the locking arm holding unit 600 because of the force with which the locking arm 500 is returned to its original position. Thereby, the locking arm holding unit 600 is rotated again in the reverse direction. To prevent this event, the stop protrusion 660 is provided on the upper end of the locking arm holding unit 600. In detail, when the locking arm holding unit 600 is rotated in the normal direction, the stop protrusion 660 is hooked to the hook 720, thus preventing the locking arm holding unit 600 from being undesirably rotated in the reverse direction.

When the actuation arm 200 rotates in the reverse direction and thus pushes the stopper 740 upwards, the hook 720 is also pushed upwards and removed from the stop protrusion 660. When the actuating arm 200 further rotates in the reverse direction until the guide pin 240 pushes the second end 624 of the guide slot 620, the locking arm holding unit 600 is rotated in the reverse direction. The locking pin 540 is inserted into the insert depression 640 again by the reverse rotation of the locking arm holding unit 600, and the locking arm 500 is returned to its original position.

As described above, in an apparatus for locking a table of a seat back according to the present invention, the table can be locked to the seat back by a relatively simple structure without using a separate gas spring mechanism. Furthermore, the angle at which the table is locked to the seat back is adjustable. In addition, a gap between the table and the seat back when the table is retracted into the seat back is minimized, thus ensuring a good appearance, and preventing the table from interfering with knees of a passenger.

For convenience in explanation and accurate definition in the appended claims, the terms "upper", "lower", "downward", "forward", and "reverse" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for locking a table of a seat back, the apparatus being provided between the table and the seat back to selectively secure the table with respect to the seat back in multiple stages, comprising:
   a base fastened to the seat back;
   a shaft pivotally coupled to the base and fastened on an end portion of the table, the shaft being rotatable along with the table on the base;
   an actuating arm fastened to the shaft and rotatable along with the shaft, the actuating arm having actuating gear teeth formed in an end portion thereof;
   a locking arm rotatably provided on the base at a position spaced apart from the shaft by a predetermined distance, wherein the locking arm includes locking gear teeth formed in an end portion thereof and elastically biased toward the shaft and the locking gear teeth are configured to be selectively engaged with the actuating gear teeth by a rotation of the actuating arm such that when the actuating arm is rotated in a forward direction, the actuating gear teeth are engaged with the locking gear teeth or pass over the locking gear teeth according to rotational degree of the actuating arm; and a locking arm holding unit co-axially coupled with the actuating arm to the base and selectively activated by the actuating arm, wherein, while the actuating gear teeth completely pass over the locking gear teeth, the actuating arm activates the locking arm holding unit to release the locking arm from a first position of the locking arm holding unit to be locked to a second position thereof so that the locking gear teeth does not interfere with the actuating gear teeth while the actuating arm is rotated in a reverse direction, and wherein the locking arm holding unit releases the locking arm to return to the first position of the locking arm holding unit so that the locking gear teeth is positioned to a trajectory locus of the locking gear teeth when the actuating arm rotates the locking arm holding unit in the reverse direction.

2. The apparatus as set forth in claim 1, further comprising a guide pin provided on the actuating arm and configured to be selectively coupled to the locking arm holding unit according to a rotational direction of the actuating arm.

3. The apparatus as set forth in claim 2, wherein a guide slot is formed in the locking arm holding unit to receive the guide pin of the actuating arm therein, the guide slot extending a predetermined length along a trajectory locus of the guide pin, so that when the guide pin pushes a first end of the guide slot, the locking arm holding unit is rotated in the forward direction, when the guide pin pushes a second end of the guide slot, the locking arm holding unit is rotated in the reverse direction, and while the guide pin moves between the first and second ends of the guide slot, the locking arm holding unit is secured stationary.

4. The apparatus as set forth in claim 3, further comprising:
a stop protrusion provided on the locking arm holding unit,
a hook pivotally mounted to the base; and
a stopper fastened to the hook to rotate along with the hook,
wherein the hook or the stopper is elastically supported to bias the hook toward the locking arm holding unit to selectively couple the hook to the stopper protrusion of the locking arm holding unit, and
wherein the hook is configured to lock the stop protrusion to the base to prevent the locking arm holding unit from rotating in the reverse direction while the locking arm is locked to the locking arm holding unit in the second position thereof, but when the actuating arm is rotated in the reverse direction to the predetermined distance, the stopper is pushed by the guide pin of the actuating arm to release the hook from the stop protrusion to enable the locking arm holding unit to rotate in the reverse direction by the actuating arm.

5. The apparatus as set forth in claim 4, wherein the stopper is disposed in front of the second end of the guide slot in the reverse direction of the locking arm holding unit such that the hook is released from the stopper protrusion before the second end of the guide slot is activated by the actuating arm when the locking arm holding unit rotates in the reverse direction.

6. The apparatus as set forth in claim 2, wherein a locking pin is provided on the locking arm, and a locking depression is formed at the second position of the locking arm holding unit, so that while the locking arm holding unit is rotated in the forward direction, the locking pin is locked to the locking depression by the locking arm holding unit while the actuating gear teeth pass over the locking gear teeth.

7. The apparatus as set forth in claim 6, wherein an insert depression extending from one end of the insert depression is formed at the first position of the locking arm holding unit so that the locking pin of the locking arm is inserted into the insert depression when the guide pin rotating in the reverse direction activates the second end of the guide slot of the locking arm holding unit.

8. The apparatus as set forth in claim 7, wherein a rotational radius between the rotation axis of the locking arm holding unit and the insert depression is shorter than a rotational radius between the rotation axis of the locking arm holding unit and the locking depression.

9. The apparatus as set forth in claim 2, further comprising a stop protrusion provided on the locking arm holding unit, wherein a subsidiary locking unit is pivotally coupled to the base at a predetermined position thereof and while the locking arm is locked to the second position of the locking arm holding unit, the subsidiary locking unit locks the stop protrusion to the base to prevent the locking arm holding unit from rotating in the reverse direction.

10. The apparatus as set forth in claim 9, wherein the subsidiary locking unit comprises:
a hook pivotally mounted to the base; and
a stopper fastened to the hook to rotate along with the hook,
wherein the hook or the stopper is elastically supported to bias the hook toward the locking arm holding unit to selectively couple the hook to the stopper protrusion of the locking arm holding unit, and
wherein the hook is configured to lock the stop protrusion to the base to prevent the locking arm holding unit from rotating in the reverse direction while the locking arm is locked to the locking arm holding unit in the second position thereof, but when the actuating arm is rotated in the reverse direction to the predetermined distance, the stopper is pushed by the guide pin of the actuating arm to release the hook from the stop protrusion to enable the locking arm holding unit to rotate in the reverse direction by the actuating arm.

* * * * *